(12) United States Patent
Vasseur et al.

(10) Patent No.: US 9,344,355 B2
(45) Date of Patent: May 17, 2016

(54) HANDLING UNACCEPTABLE ASYMMETRICAL COMMUNICATION PATHS IN COMPUTER NETWORKS

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 118 days.

(21) Appl. No.: 14/039,191

(22) Filed: Sep. 27, 2013

(65) Prior Publication Data

US 2015/0092538 A1 Apr. 2, 2015

(51) Int. Cl.
*H04L 12/54* (2013.01)
*H04L 12/707* (2013.01)
*H04L 12/725* (2013.01)
*H04L 12/26* (2006.01)

(52) U.S. Cl.
CPC .............. *H04L 45/24* (2013.01); *H04L 45/308* (2013.01); *H04L 43/08* (2013.01)

(58) Field of Classification Search
CPC ....................................................... H04L 12/56
USPC ............................................................ 370/225
See application file for complete search history.

(56) References Cited

U.S. PATENT DOCUMENTS

| | | | |
|---|---|---|---|
| 5,182,744 A * | 1/1993 | Askew et al. ................. 370/228 |
| 2007/0087756 A1* | 4/2007 | Hoffberg ....................... 455/450 |
| 2007/0217406 A1* | 9/2007 | Riedel et al. .................. 370/389 |
| 2013/0010604 A1* | 1/2013 | Zhang ................... H04L 41/082 370/241 |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Wei Zhao
(74) *Attorney, Agent, or Firm* — Parker Ibrahim & Berg LLC; James M. Behmke; Stephen D. LeBarron (57) ABSTRACT

In one embodiment, a plurality of communication paths in a second direction in a communication network is determined, based on reversing communication paths established in a first direction in the communication network. Then, a path quality of the communication paths in the second direction is monitored. Based on the monitored path quality, it is then determined whether the communication paths in the second direction satisfy a communication requirement. Finally, a particular communication path of unacceptable quality in the second direction is detected when the particular communication path in the second direction fails to satisfy the communication requirement.

25 Claims, 9 Drawing Sheets

HANDLING UNACCEPTABLE ASYMMETRICAL COMMUNICATION PATHS IN COMPUTER NETWORKS

TECHNICAL FIELD

The present disclosure relates generally to computer networks, and, more particularly, to handling unacceptable asymmetrical communication paths.

BACKGROUND

Low-Power and Lossy Networks (LLNs) frequently employ communication links which are highly unstable by nature with recurrent link failures and intermittent connectivity. These issues can be further complicated because link qualities (e.g. in terms of delay, reliability, . . . ) are not symmetric. That is, the communication links can be favorable in the upstream direction (e.g., from a node towards a root node), but unusable (or non desirable) with myriad perturbations in the downstream direction (e.g., from a parent node to a child node), and vice-versa. Due to this, downstream traffic could often suffer from low quality of service (QoS), and even failures to deliver, although the path quality in the upstream direction may meet QoS requirements. Note also that some flows may also require symmetrical path characteristics (e.g. the delay in one directions should not exceed the delay in the other direction by more than X %).

This issue becomes even more critical if the node in-question has a high "centrality" in the network (e.g., the node is located along a communication path of many other nodes), and thus is used as transit for many nodes. For example, the overall connection quality in the network may be stable, but a few select nodes with very high centrality may handle a majority of the transit traffic. This can be unfavorable since it places a lot of processing pressure on the centrally-located nodes and leads to network congestion because of the high amount of traffic transiting these regions. It can also make the network very fragile with limited multi-path options at critical times.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a plurality of communication paths in a second direction in a communication network is determined, based on reversing communication paths established in a first direction in the communication network. Then, a path quality of the communication paths in the second direction is monitored. Based on the monitored path quality, it is then determined whether the communication paths in the second direction satisfy a communication requirement. Finally, a particular communication path of unacceptable quality in the second direction is detected and corrected when the particular communication path in the second direction fails to satisfy the communication requirement.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
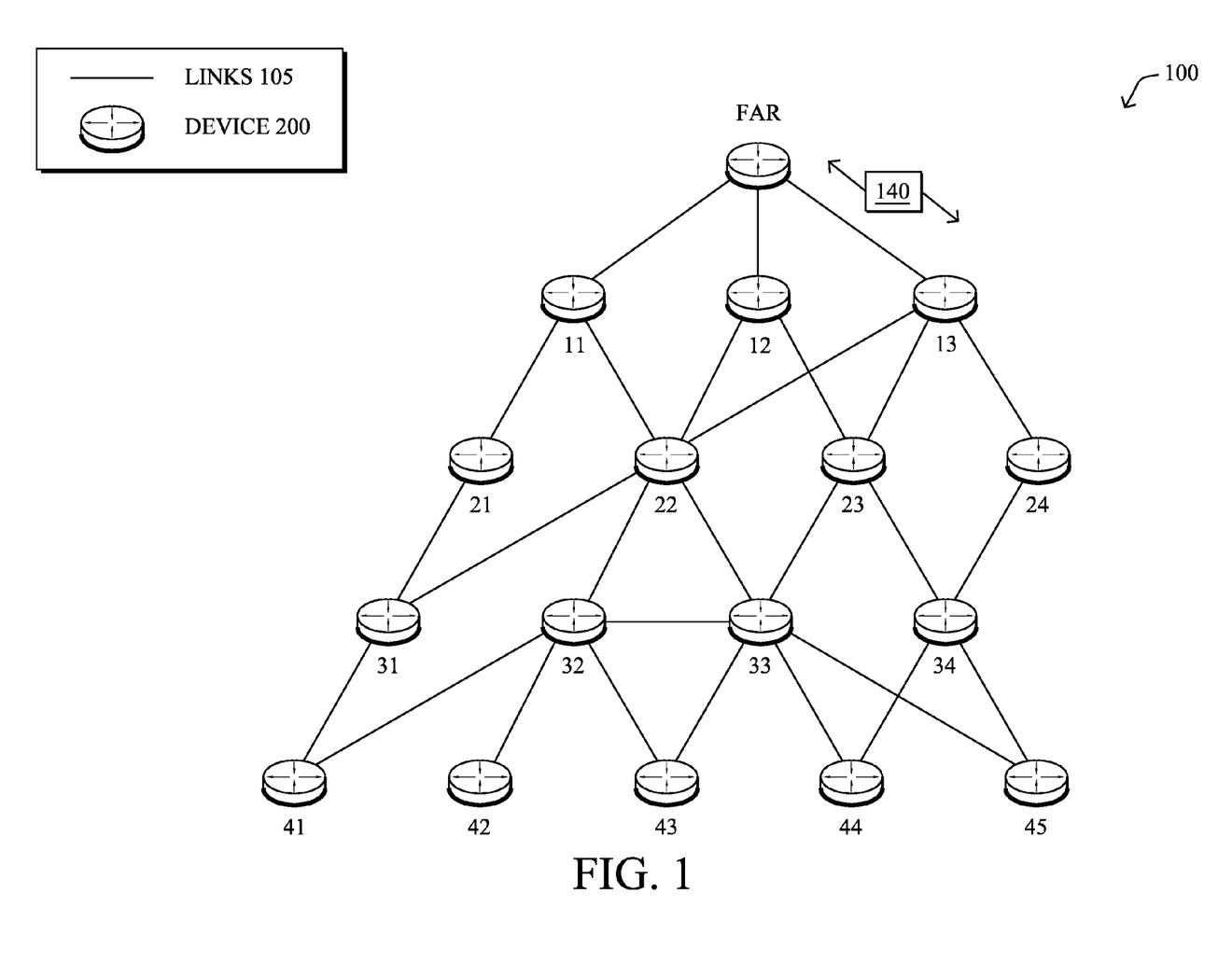
FIG. 1 illustrates an example communication network.

FIG. 1 is a schematic block diagram of an example computer network 100 illustratively comprising nodes/devices 200 (e.g., labeled as shown, "FAR," "11," "12," . . . "45," and described in FIG. 2 below) interconnected by various methods of communication. For instance, the communication links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a field area router (FAR) as a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
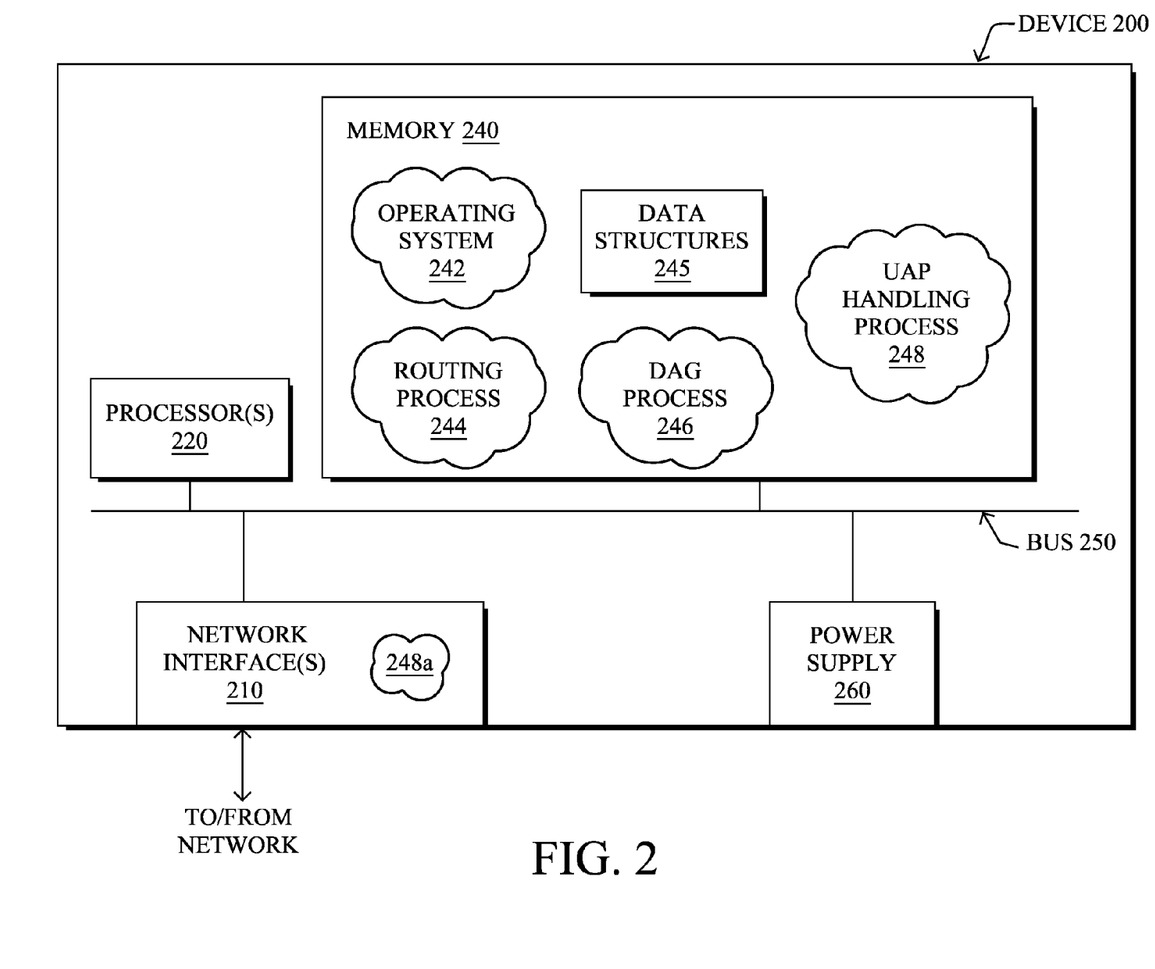
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have multiple different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software is programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative unacceptable asymmetrical path (UAP) handling ("UAP handling") process 248, as described herein. Note that while the UAP handling process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

Figure 3:
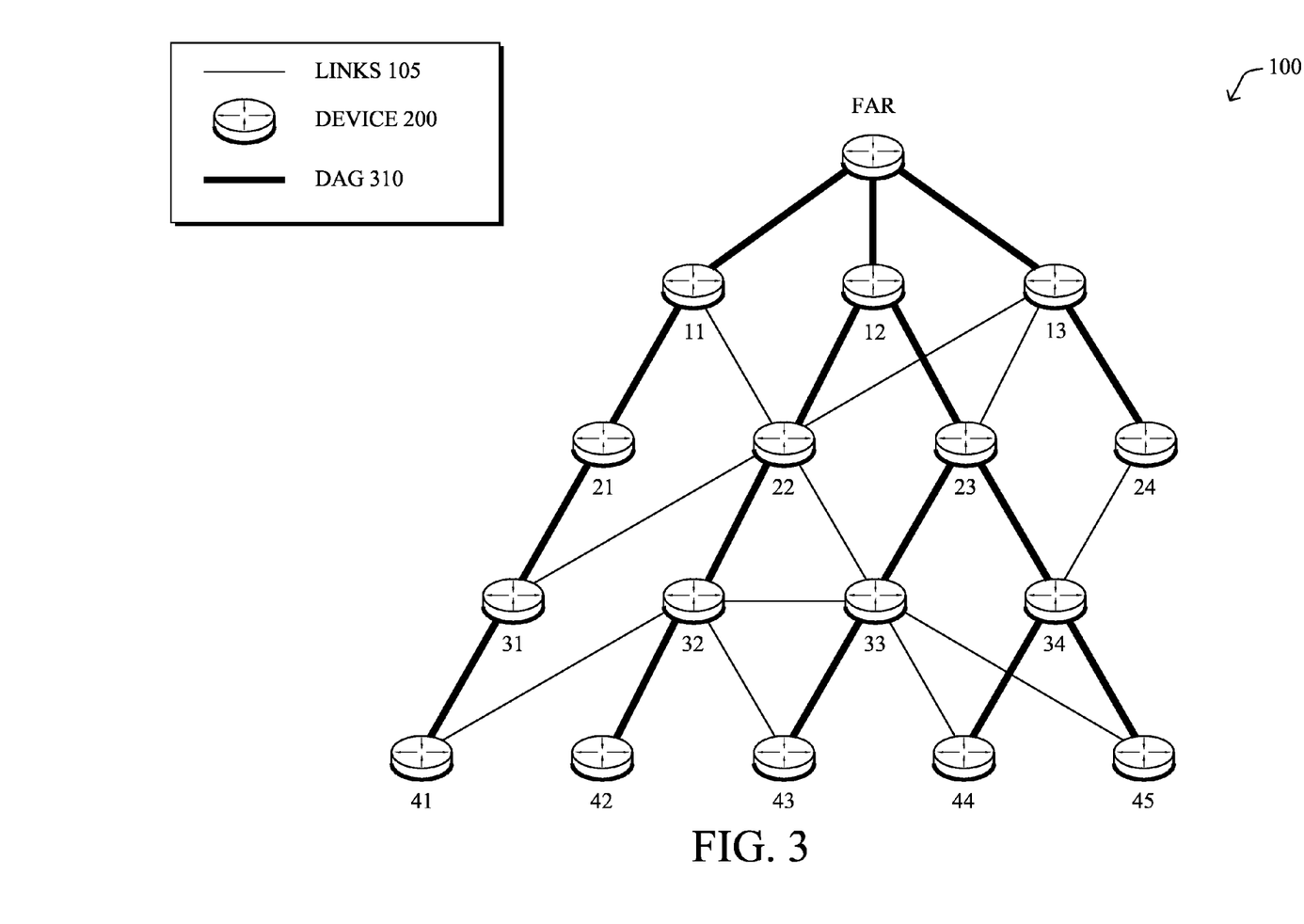
FIG. 3 illustrates an example simplified directed acyclic graph (DAG) within a communication network.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node, e.g., FAR, toward one or more leaf nodes (nodes without children). Traffic/packets 140 (shown in FIG. 1) may then traverse the DAG 310 in either the upstream direction toward the FAR or downstream toward the leaf nodes, particularly as described herein.

As further noted above, a known characteristic of communication links in LLNs is their asymmetrical nature, whereby a link may be of high quality in one direction and low/medium quality in the opposite direction. This issue becomes even more critical if the node in-question has a high "centrality" in the network (e.g., the node is located along a communication path of many other nodes), and thus is used as transit for many nodes. For example, the overall connection quality in the network may be stable, but a few select nodes with very high centrality may handle a majority of the transit traffic. This can be unfavorable since it places a lot of processing pressure on the centrally-located nodes and leads to network congestion because of the high amount of traffic transiting these regions. It can also make the network very fragile with limited multi-path options at critical times.

Handling Unacceptable Asymmetric Communication Paths

The techniques herein deal with the presence of unacceptable asymmetrical paths (UAPs) in LLNs, due to the asymmetrical nature of these links, without having to change the routing paradigm in these networks. The present disclosure may illustratively employ the following dual mode of operation: 1) while upstream routing is unchanged (e.g., using a distributed routing protocol such RPL, for example), 2) downstream path quality is monitored by the root node, e.g., FAR, using various data-path or control plane (e.g., link quality metrics, OAM probes) mechanisms in order to determine the presence of unacceptable asymmetrical paths, according to a service level agreement (SLA) dynamically retrieved by the FAR, e.g., from a network management system/server (NMS). The FAR may then determine if a next-hop selection change exists for a remote node using a technique that can be performed by a less-constrained node, such as the FAR, in order to remove the presence of the UAP, or whether a PAN migration for the node is possible and required. Additionally, a message may be used to send a notification of the next-hop selection by the FAR.

Specifically, according to one or more embodiments of the disclosure as described in detail below, a plurality of communication paths in a second direction in a communication network is determined, based on reversing communication paths established in a first direction in the communication network. Then, a path quality of the communication paths in the second direction is monitored. Based on the monitored path quality, it is then determined whether the communication paths in the second direction satisfy a communication requirement. Finally, a particular communication path of unacceptable quality in the second direction is detected when the particular communication path in the second direction fails to satisfy the communication requirement.

Illustratively, the techniques described herein may be performed by hardware, software, and/or firmware, such as in accordance with the "UAP handling" process 248/248a, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the RPL routing protocol, and as such, may be processed by similar components understood in the art that execute those protocols, accordingly.

Operationally, the disclosed embodiments employ a reactive feedback-driven approach through use of the FAR so as to avoid UAPs. In the context of present disclosure, a UAP is specified as a communication path, as described above, where the path quality in upstream direction is "optimal" according to the particular routing protocol (e.g., a routing protocol such as RPL that minimizes the path cost using additive routing metrics), and where the path quality in the downstream direction is not acceptable (e.g., the path cost or, more likely, the path error rate in the downstream direction is too high). Notably, although the disclosed embodiments are often herein described in the context of a protocol such as RPL, it is not specific to RPL or to LLNs, but rather to all varieties of routing protocols and networks, in presence of asymmetrical communication links.

Figure 4:
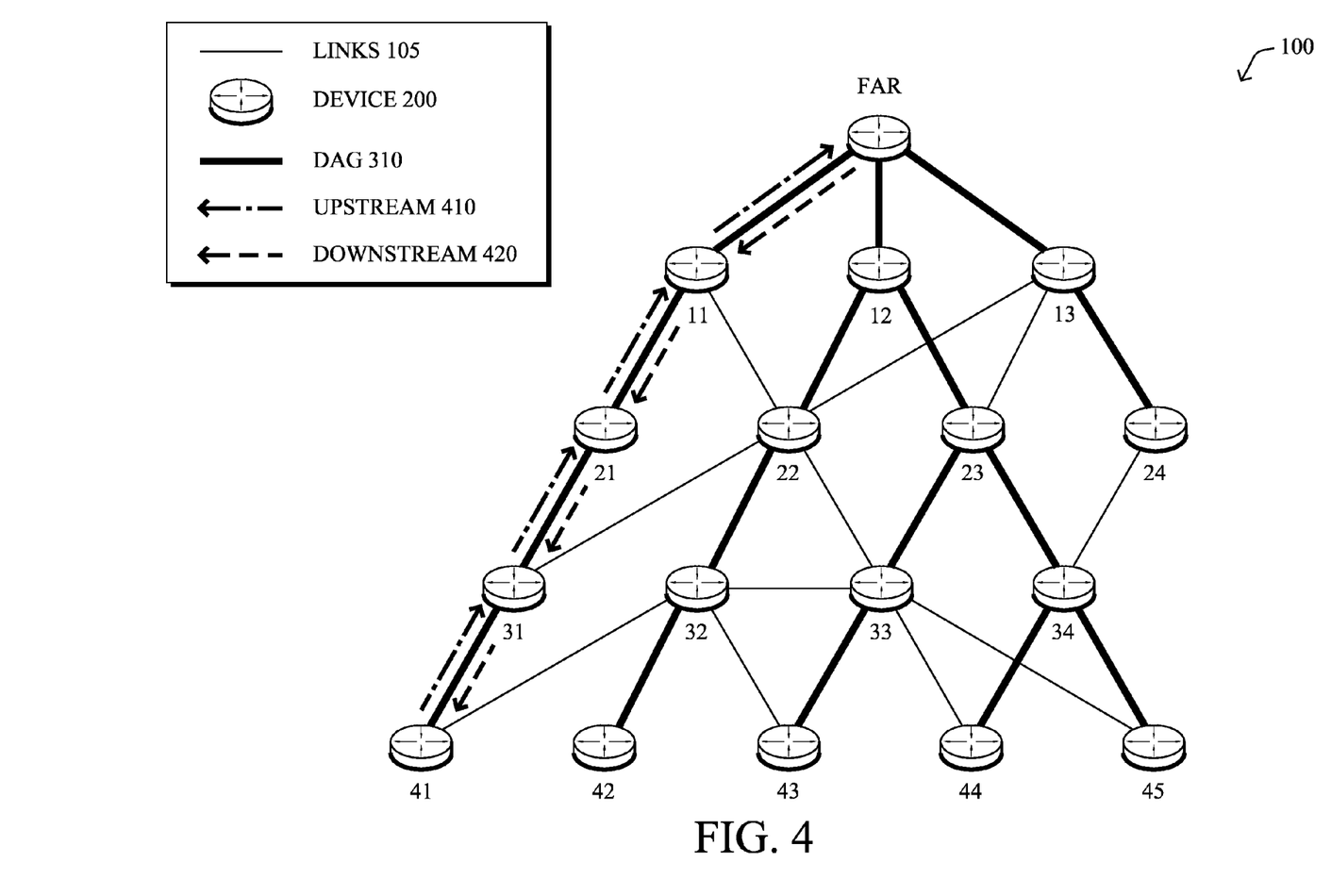
FIG. 4 illustrates an example communication network with upstream and downstream traffic.

FIG. 4 illustrates an example communication network with upstream and downstream traffic. As shown in FIG. 4, computer network 100 comprises nodes 200 interconnected by communication links 105, in the manner described above. Illustratively, upstream traffic 410 and downstream traffic 420 may travel from node-to-node via the communication links 105. In this regard, upstream traffic 410 travels in an "upstream direction," whereby the upstream direction is a direction from a child node of the DAG 310 toward a parent node of the child node. Conversely, downstream traffic 420 travels in a "downstream direction," whereby the downstream direction is a direction from a parent node of the DAG 310 toward a child node of the parent node. For the purposes of the present disclosure, the upstream direction may preferably be referred to as a "first direction," and the downstream direction may preferably be referred to as a "second direction." However, in the alternative, it may be possible for the upstream direction to be referred to as the "second direction," and for the downstream direction to be referred to as the "first direction."

Upstream and downstream traffic, e.g., data packet transmissions, may differ in the manner in which they are routed in a network by the active routing protocol. For example, in an RPL-based non-storing network, such as an LLN, upstream-directed packets may be routed hop-by-hop in the upstream direction according to an additive unidirectional metric defined by the routing protocol. On the other hand, downstream directed packets may be IP source-routed in the downstream direction using network topology information collected by the root node, e.g., FAR. By default, the FAR typically does not have any initial information about communication link metrics, e.g., path quality, success/error rate, delay, etc. in the downstream direction. Thus, it may be advantageous to keep track of such link metrics for communication paths in the downstream direction, without using the active routing protocol, but rather using IP packets source-routed in the downstream direction, as described in further detail below.

Figure 5:
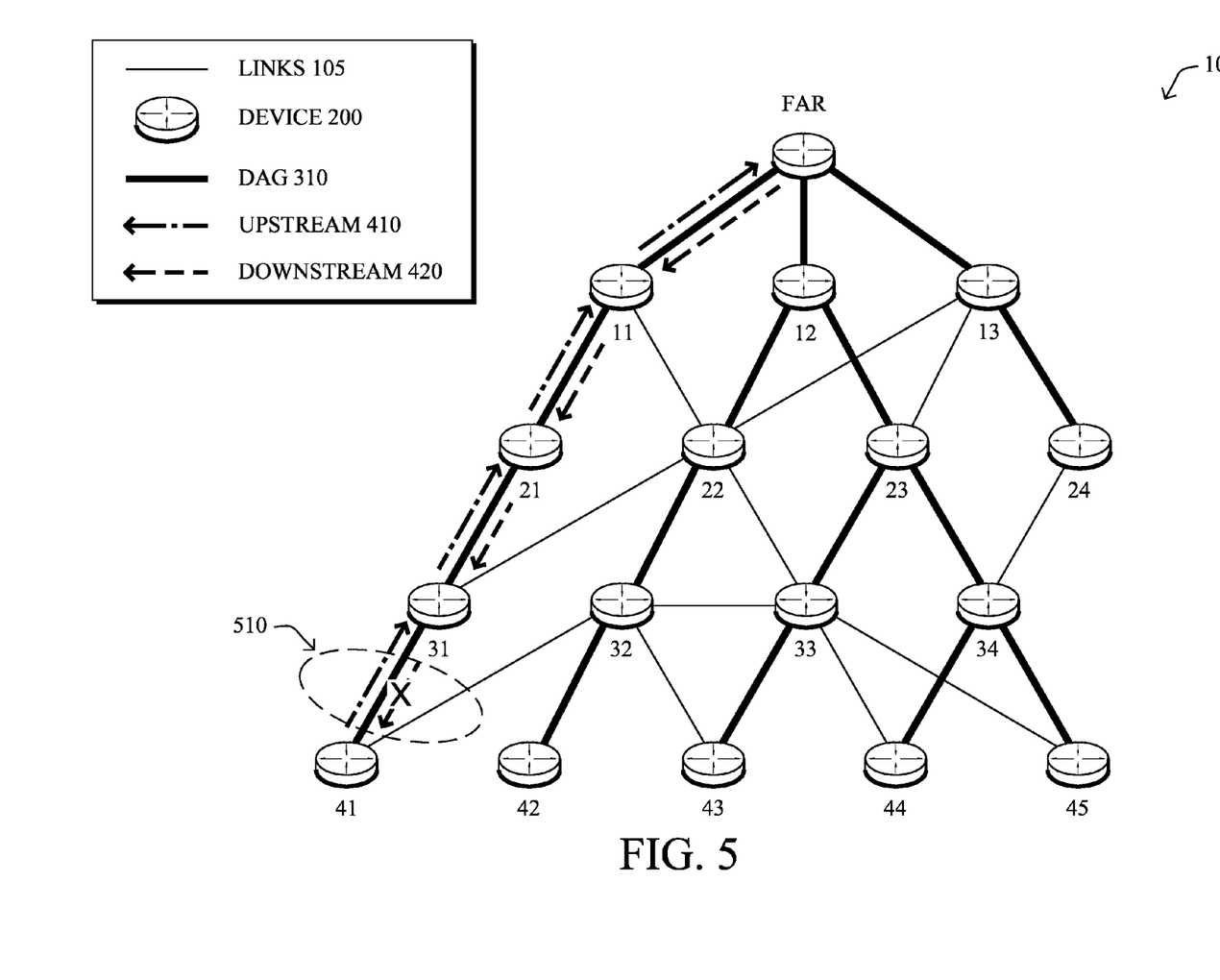
FIG. 5 illustrates an example communication network with an unacceptable asymmetric path.

FIG. 5 illustrates an example communication network with an unacceptable asymmetric path. As shown in FIG. 5, computer network 100 comprises nodes 200 interconnected by communication links 105, in the manner described above. Illustratively, the communication links 105 may include a communication path of unacceptable downstream quality, i.e., unacceptable asymmetric path 510.

As explained above, an unacceptable asymmetric path is a communication link/path which is favorable in one direction, e.g., the upstream direction, but unusable with myriad perturbations in the opposite direction, e.g., the downstream direction. Due to this, downstream traffic could often suffer from low quality of service (QoS), and even failures to deliver, although the path quality in the upstream direction may meet QoS requirements. As depicted in FIG. 5, the communication path designated as UAP 510, e.g., between nodes 31 and 41, suffers from poor downstream path quality, while the upstream path quality of the same communication path is of satisfactory quality. In this sense, the quality of the communication path may be considered asymmetric. Although FIG. 5 depicts a communication path with unacceptable downstream quality, the present disclosure is also applicable to asymmetric communication paths with unacceptable upstream quality.

In order to identify the unacceptable asymmetric paths in the network 100, the FAR may monitor the path quality of communication paths 105 in the network, and particularly, the downstream path quality of the communication paths in the network. This may be done without using the active routing protocol, such as RPL, for example, but rather using IP packets source-routed in the downstream direction. In particular, the FAR may keep track of various characteristics/metrics of communication paths 105 between the nodes 200 in the network 100.

A variety of metrics may be utilized by the FAR in monitoring the downstream path quality of the communication paths 105. For example, a transmission quality metric of the communication paths may be monitored. An oft-used transmission quality metric is the "expected transmission count" (ETX), which is the number of expected transmissions of a packet necessary for it to be received without error at its destination. Alternatively or in addition, the FAR may monitor Internet Control Message Protocol (ICMP) error messages received due to packet delivery failures, which advantageously which involves no additional control plane overhead. Other path quality metrics to be monitored include, for example, the data transmission/receipt delay (using, e.g., OAM probes, a learning machine performing linear regression, etc.), the rate of transmission error/success, and the like. The path quality metrics may be monitored, and optionally recorded, in one or both of the upstream and downstream directions, and may be is monitored on a per-link basis. Also, a communication link metric may carried in a downstream-directed message, e.g., a Destination Advertisement Object (DAO) message (in the case of RPL), in order to carry link metrics in the downstream direction.

Moreover, the FAR may determine an acceptable level of asymmetry between a path quality (e.g., ETX, delay, error/success rate, etc.) of a communication path in the downstream direction and a path quality of the same communication path in an upstream direction. For example, the FAR may establish an acceptable asymmetry level whereby the difference in upstream and downstream transmission delay may not exceed a threshold value or ratio/percentage, which may be predetermined or dynamically computed by the FAR. After determining the acceptable level of asymmetry, the FAR may monitor the asymmetry level of communication links 105 in the network 100 to ensure a desired level of symmetry in the communication links.

The level of acceptableness in path quality may vary on a network-by-network basis. Thus, it may be advantageous to determine a communication requirement associated with the nodes in the particular network. Then, the FAR of the particular network may determine whether a communication path in the downstream direction (or alternatively, the upstream direction) satisfies the communication requirement based on the monitored downstream path quality, as described above. As a result, a communication path of unacceptable downstream quality (or alternatively, unacceptable upstream quality) may be detected when the communication path in the downstream direction fails to satisfy the communication requirement. In other words, though in one embodiment asymmetry may be determined as a difference between the quality of the upstream and downstream directions, in another embodiment, the asymmetry may alternatively or additionally be based on an absolute quality requirement in the downstream direction, regardless of the upstream direction's quality.

Illustratively, the asymmetry level and quality requirement, e.g., "communication requirement," may stem from a service level agreement (SLA) associated with the nodes 200 in the network 100. The SLA may define various network policies and standards which impose performance-related restrictions (asymmetry level and absolute quality, or generally "communication requirements" herein) upon the nodes in the network. As such, the FAR of a particular network, e.g., a PAN, may retrieve a SLA associated with the nodes in the network. The SLA may be retrieved from a central management node, such as an NMS. Further, a single retrieved SLA may be applicable to each node/communication path in the network, or the appropriate SLA may be retrieved on a node-by-node/path-by-path basis.

Notably, the SLA may be retrieved using an IPv6 message, such as a CoAP or SMNPv3 message. For example, the message may specify an end-to-end path success rate for every node in the network. In such a situation, each node 200 in the network 100 may continue to optimize upstream path routing using a distributed routing protocol, e.g., RPL, while the FAR may ensure that the downstream path cost meets the SLA in terms of end-to-end path error success rate, as specified by the message.

When the FAR determines whether a communication path in the downstream direction satisfies the communication requirement, as defined by the SLA or otherwise, a second message may be utilized by the FAR to send reports to the central management node, e.g., NMS, to indicate whether or not the particular communication path managed to satisfy the requirement. Additionally, the FAR may report to the NMS that it managed to modify the next-hop selection of a remote node 200, as described in further detail below, in order for the downstream path success delivery rate to satisfy the SLA requirements dictated by the NMS.

Figure 6:
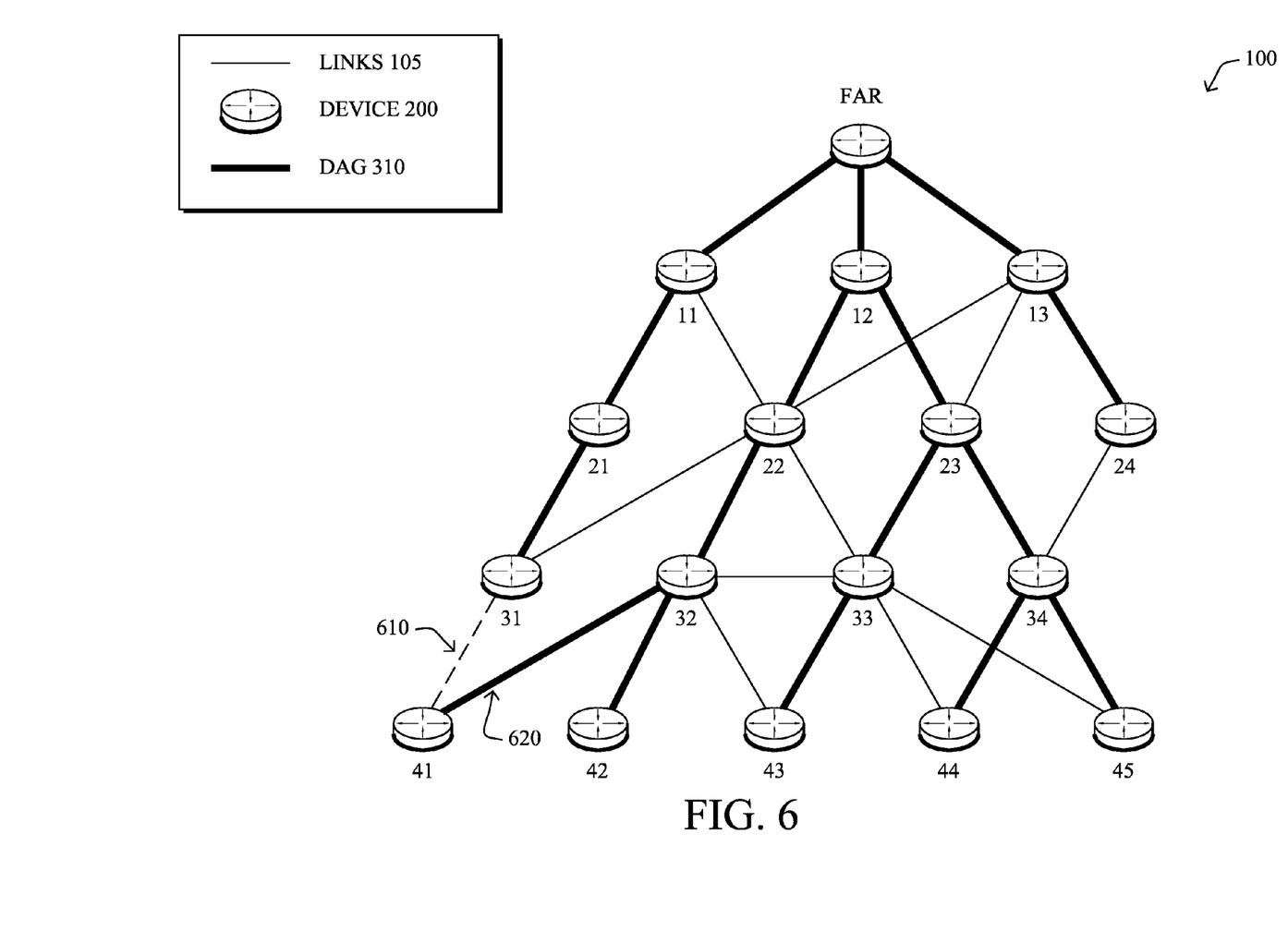
FIG. 6 illustrates an example communication network with an alternate next-hop selection.

FIG. 6 illustrates an example communication network with an alternate next-hop selection. As shown in FIG. 6, computer network 100 comprises nodes 200 interconnected by communication links 105, in the manner described above. Illustratively, an alternate next-hop selection 620 is computed to avoid the communication path of unacceptable downstream quality 610.

Upon detection of the UAP 510/610, the root node, e.g., FAR, may attempt to modify the next-hop selection of a remote node 200 which is affected by the UAP. In doing so, the FAR may inspect the network topology to examine the communication paths proximate to the affected node. The network topology may be examined as network topology information which is retrieved, for example, by the FAR from a database. The network topology information may be augmented by a downstream path quality in order to determine whether an alternate next-hop could be found to remove the UAP. It should be understood, however, that the alternate next-hop selection should not incorporate another UAP for the affected node or its children. Thus, it may be determined whether the alternate next-hop selection satisfies the communication requirement, derived from the SLA, for example, based on a monitored downstream path quality of the alternate next-hop selection. If an alternate next-hop selection in fact exists, which removes the UAP from a routing path for the affected node, a unicast IPv6 message, e.g., a CoAP message, may be sent to the affected node to instruct it utilize the next-hop selection for future communications, thereby assigning the node a new parent node.

For example, as depicted in FIG. 6, if the node 41 selects the node 31 as its best next-hop selection using the ETX link metric to optimize the upstream path cost (according to the active routing protocol), but the downstream path 11-21-31-41 is detected as being a UAP, e.g., the success delivery rate along the path is too low (according to the SLA), then the FAR may send a message to the node 41 to instead select the node 32 as its best next-hop, even though the path cost in the upstream direction may be increased. It should be understood, however, note that such a path cost increase should still satisfy the communication requirement(s) set forth by the SLA. Notably, the UAP may be caused by a single communication path, such as the UAP 610 illustrated in FIG. 6, or by a plurality of communication paths. When the network topology is altered due to the computation of the alternate next-hop selection 620, the FAR may record the updated topology information.

Figure 7:
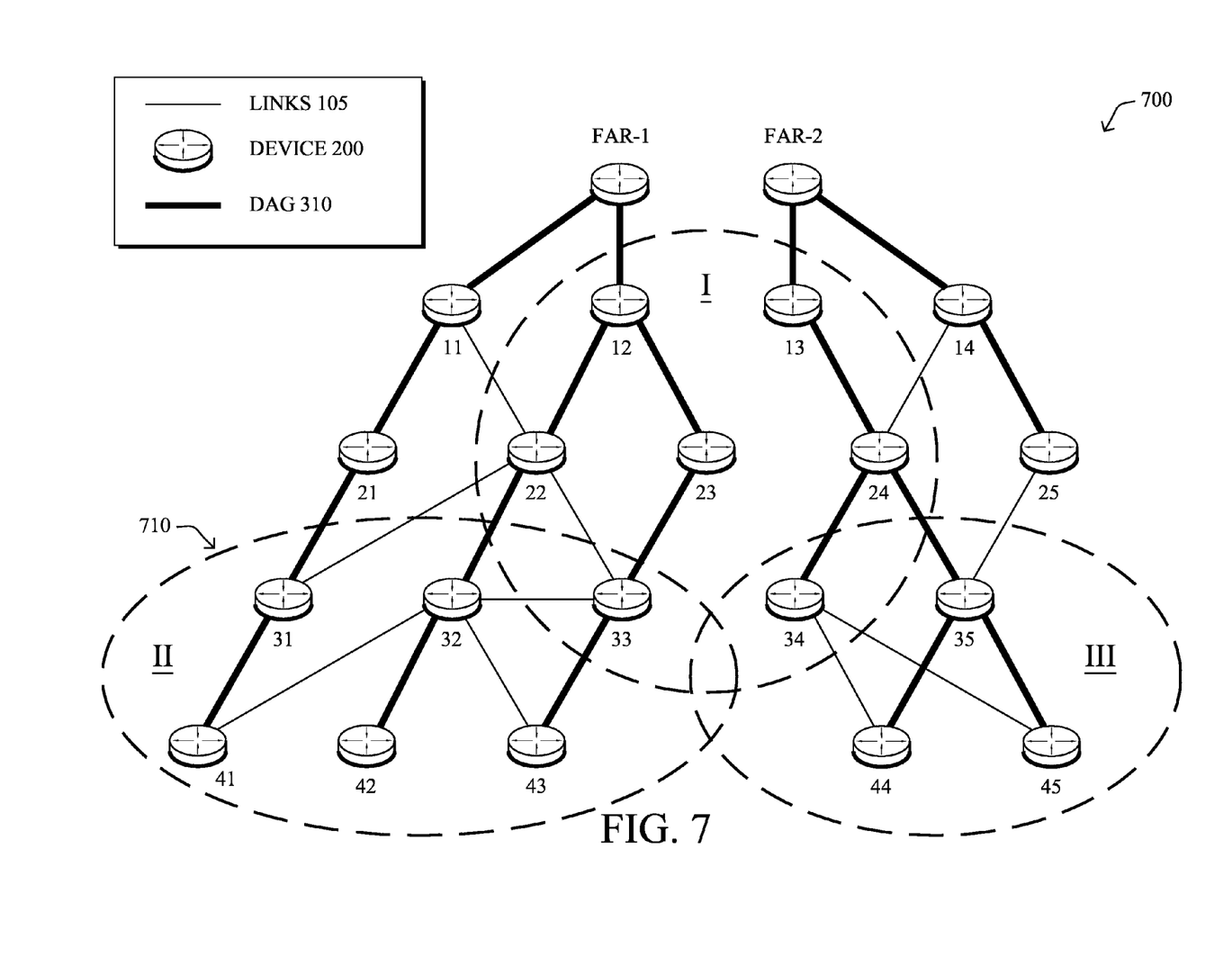
FIG. 7 illustrates an example communication network including multiple PANs.

FIG. 7 illustrates an example communication network including multiple PANs. As shown in FIG. 7, computer network 700 comprises nodes 200 interconnected by communication links 105, in the manner described above. Illustratively, the network 700 includes a first PAN, with a first root node ("FAR-1"), and a second PAN, with a second root node ("FAR-2").

As depicted in FIG. 7, many of the nodes 200 in the network 700 may be located within RF domains ("I," "II," and "III"). Because the first and second PAN may be located geographically proximate to one another, certain nodes in neighboring PANs may reside within the same RF domain. For example, node 12, which is a leaf node in the first PAN headed by FAR-1 resides in RF domain I; similarly, node 13, which is a leaf node in the second PAN headed by FAR-2 also resides in RF domain I. Because of this, another option for handling an unacceptable asymmetric path in the network 700 may be to migrate a node affected by the UAP from one PAN to another.

As would be understood to one of ordinary skill in the art, when nodes move from one PAN to the other, it is termed a "migration." Node migrations take place either when nodes find a better path in another PAN or for load-balancing the number of nodes amongst PANs. There are several timing procedures and stopgap mechanisms put in place to make sure oscillations do not occur. Routing protocols make use of various techniques to decide whether to migrate (e.g., select a different routing adjacency) according to path quality of the communication paths. In particular, in classic IP networks, the decision is solely driven by the absolute path cost; in contrast, a distributed routing protocol such a RPL makes use of low pass filter and triggers of various types to migrate if, and only if, the new path is significantly better and has been significantly better for some period (this helps to avoid oscillations in the presence of links with varying quality).

Figure 8:
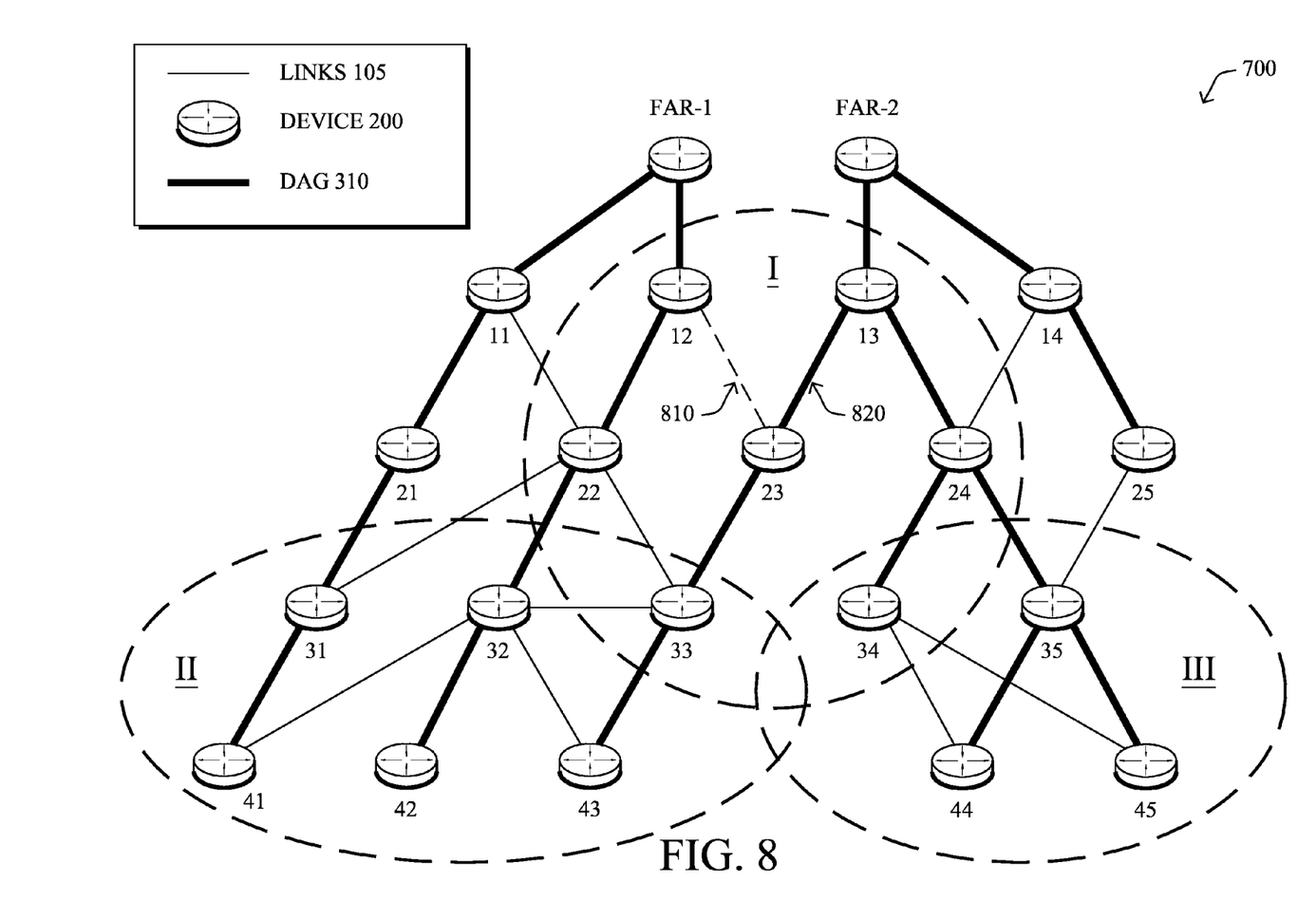
FIG. 8 illustrates an example of node migration across neighboring PANs.

FIG. 8 illustrates an example of node migration across neighboring PANs. As shown in FIG. 8, computer network 700 comprises nodes 200 interconnected by communication links 105, in the manner described above. Illustratively, a communication path 820 from a node of a first PAN to a node of a second PAN is computed to avoid a communication path of unacceptable downstream quality 810.

In addition, or as an alternative, to the techniques above, upon detecting of the communication path of unacceptable downstream quality 810, it may be determined whether it is possible for a node in the network affected by the communication path of unacceptable downstream quality to migrate to another network to avoid the UAP. This may ensure that poor link qualities (e.g. delay, reliability, . . . ) do not last for long periods of time when there are better alternative communication paths to be utilized in neighboring PANs. In doing so, the FAR of the particular network may attempt to detect peer-FARs to initiate a query of their respective databases with the intent of finding nodes which lie within the geographical coordinates of the affected node. In response to the requesting FAR, the peer-FARs may calculate the link quality of nearby communication paths in one or both directions, e.g., upstream/downstream, using, for example, mean/min/max ETX, mean rank, etc. The requesting FAR may then determine whether migration is possible based on the determined link quality computed by the peer FANs, e.g., whether the determined link quality is better than its own communication paths in the same or nearby geographical region.

If node migration to a nearby network, e.g., PAN, is possible, the FAR may trigger the migration by sending a message, e.g., a CSMP message, to the affected node that instructs the node to migrate to the other network. As depicted in FIG. 8, the node 23, which is affected by the UAP 810, may be instructed by the FAR-1 to migrate to the nearby node headed by the FAR-2. Accordingly, the migrating node 23 may be assigned a new parent node, e.g., node 13, in the respective PAN, via the newly discovered communication path 820. The migrating node may also maintain its state prior to migration, which may prevent the node from oscillating back and forth between PANs. Moreover, specific nodes may be preserved in the network topology merely for on-demand migration purposes, in a manner similar to which "dummy" meters are placed in the topology to increase the network's range.

Figure 9:
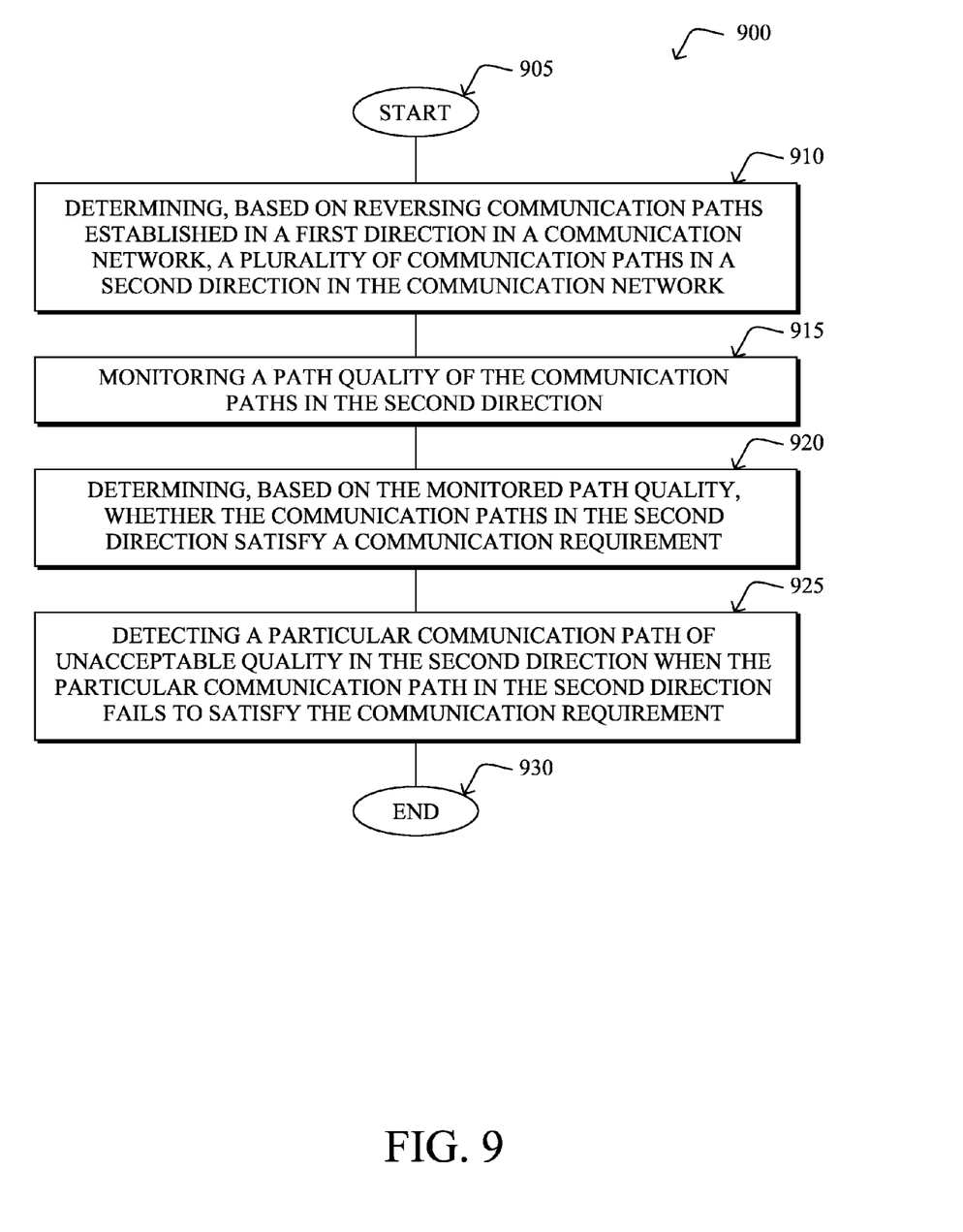
FIG. 9 illustrates an example simplified procedure for handling unacceptable asymmetric communication paths.

FIG. 9 illustrates an example simplified procedure 900 for handling unacceptable asymmetric communication paths. As shown in FIG. 9, the procedure 900 may start at step 905, continue to step 910, and so forth, where, as described in greater detail above, a downstream path quality of communication paths is monitored, and, as a result, a communication path of unacceptable downstream quality may be detected.

At step 910, a plurality of communication paths in a second direction in a communication network is determined, based on reversing communication paths established in a first direction in the communication network. Then, at step 915, a path quality of the communication paths in the second direction is monitored. At step 920, based on the monitored path quality, it is then determined whether the communication paths in the second direction satisfy a communication requirement. As a result, at step 925, a particular communication path of unacceptable quality in the second direction is detected when the particular communication path in the second direction fails to satisfy the communication requirement. The procedure 900 illustratively ends at step 930. The techniques by which the steps of procedure 900 may be performed, as well as ancillary procedures and parameters, are described in detail above.

It should be understood that the steps shown in FIG. 9 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for handling unacceptable asymmetric communication paths. In particular, the techniques herein solve a critical issue in LLNs, as well as other computer networks, whereby link asymmetry may lead to unacceptable path quality. By detecting the presence of such unacceptable asymmetrical paths, the root/FAR can modify a remote next-hop selection while otherwise preserving the normal mode of operation of routing in the network.

While there have been shown and described illustrative embodiments that provide for handling unacceptable asymmetric communication paths, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. Additionally, the embodiments have been shown as described primarily with relation to RPL and DAG-forming control messages, e.g., DIO/DAO messages. However, it should be understood that the disclosed embodiments are not limited thereto, and may be applicable to other types of protocols and data messages.

Moreover, the foregoing description has been directed to specific embodiments. It will be apparent, however, that other variations and modifications may be made to the described embodiments, with the attainment of some or all of their advantages. or instance, it is expressly contemplated that the components and/or elements described herein can be implemented as an apparatus that comprises at least one network interface that communicates with a network, e.g., an LLN, a processor coupled to the at least one network interface, and a memory configured to store program instructions executable by the processor. Further, it is expressly contemplated that the components and/or elements described herein can be implemented as software being stored on a tangible, non-transitory computer-readable medium (e.g., disks/CDs/RAM/EEPROM/etc.) having program instructions executable by a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, based on reversing communication paths established in a first direction in a communication network, a plurality of communication paths in a second direction in the communication network;
   monitoring a path quality of the communication paths in the second direction to determine a presence of an asymmetric path;
   determining, based on the monitored path quality, whether the communication paths in the second direction satisfy a communication requirement and whether the communication paths are asymmetric;
   detecting an asymmetric communication path of unacceptable quality in the second direction when the particular communication path in the second direction fails to satisfy the communication requirement;
   in response to detecting the asymmetric communication path of unacceptable quality in the second direction, determining whether an alternative next-hop selection of a remote node exists that would remove the asymmetric communication path of unacceptable quality; and
   in response to determining that the alternate next-hop exists, modifying the alternative next-hop selection of the remote node.

2. The method according to claim 1, further comprising:
   determining, in response to detecting the asymmetric communication path of unacceptable quality in the second direction, whether an alternate next-hop selection exists for a node in the communication network affected by the asymmetric communication path of unacceptable quality in the second direction, wherein the alternate next-hop selection avoids the asymmetric communication path of unacceptable quality in the second direction.

3. The method according to claim 2, wherein the determining of whether the alternate next-hop selection exists comprises:
   determining whether the alternate next-hop selection satisfies the communication requirement based on a monitored path quality of the alternate next-hop selection in the second direction.

4. The method according to claim 2, further comprising:
   when the alternate next-hop selection is determined to exist, sending a message to the node that instructs the node to utilize the alternate next-hop selection for future communications.

5. The method according to claim 1, further comprising:
   determining, in response to detecting the asymmetric communication path of unacceptable quality in the second direction, whether it is possible for a node in the communication network affected by the asymmetric communication path of unacceptable quality in the second direction to migrate to another communication network, wherein migrating to the other communication network avoids the asymmetric communication path of unacceptable quality in the second direction.

6. The method according to claim 5, wherein the determining of whether it is possible for the node to migrate to the other communication network comprises:
comparing a path quality of communication paths in the second direction in the communication network to a path quality of communication paths in the second direction in the other communication network.

7. The method according to claim 5, further comprising:
when it is determined that it is possible for the node to migrate to the other communication network, sending a message to the node that instructs the node to migrate to the other communication network.

8. The method according to claim 1, wherein the determining of the communication requirement comprises:
retrieving a service level agreement (SLA) associated with the nodes in the communication network; and
determining the communication requirement based on the SLA.

9. The method according to claim 1, further comprising:
sending a message to a central management node that indicates whether the communication path in the second direction satisfies the communication requirement.

10. The method according to claim 1, wherein the monitoring of the path quality of communication paths in the second direction comprises:
monitoring one or more of: a transmission quality metric, error messages received due to packet delivery failure, a rate of transmission error/success, data transmission/receipt delay, and a level of asymmetry between a path quality of a communication path in the second direction and a path quality of the communication path in the first direction.

11. The method according to claim 1, further comprising:
determining an acceptable level of asymmetry between a path quality of a communication path in the second direction and a path quality of the communication path in the first direction.

12. The method according to claim 1, further comprising:
sending a message indicating a path quality metric in the second direction.

13. An apparatus, comprising:
one or more network interfaces that communicate with a communication network;
a processor coupled to the one or more network interfaces and configured to execute a process; and
a memory configured to store program instructions which contain the process executable by the processor, the process comprising:
determining, based on reversing communication paths established in a first direction in the communication network, a plurality of communication paths in a second direction in the communication network;
monitoring a path quality of the communication paths in the second direction to determine a presence of asymmetric path;
determining, based on the monitored path quality, whether the communication paths in the second direction satisfy a communication requirement and whether the communication paths are asymmetric; and
detecting an asymmetric communication path of unacceptable quality in the second direction when the asymmetric communication path in the second direction fails to satisfy the communication requirement;
in response to detecting the asymmetric communication path of unacceptable quality in the second direction, determining whether an alternative next-hop selection of a remote node exists that would remove the asymmetric communication path of unacceptable quality; and
modifying, in response to determining that an alternate next-hop exists, the next-hop selection of a remote node.

14. The apparatus according to claim 13, wherein the process further comprises:
determining, in response to detecting the asymmetric communication path of unacceptable quality in the second direction, whether an alternate next-hop selection exists for a node in the communication network affected by the asymmetric communication path of unacceptable quality in the second direction, wherein the alternate next-hop selection avoids the asymmetric communication path of unacceptable quality in the second direction.

15. The apparatus according to claim 14, wherein the determining of whether the alternate next-hop selection exists comprises:
determining whether the alternate next-hop selection satisfies the communication requirement based on a monitored path quality of the alternate next-hop selection in the second direction.

16. The apparatus according to claim 14, wherein the process further comprises:
when the alternate next-hop selection is determined to exist, sending a message to the node that instructs the node to utilize the alternate next-hop selection for future communications.

17. The apparatus according to claim 13, wherein the process further comprises:
determining, in response to detecting the asymmetric communication path of unacceptable quality in the second direction, whether it is possible for a node in the communication network affected by the asymmetric communication path of unacceptable quality in the second direction to migrate to another communication network, wherein migrating to the other communication network avoids the asymmetric communication path of unacceptable quality in the second direction.

18. The apparatus according to claim 17, wherein the determining of whether it is possible for the node to migrate to the other communication network comprises:
comparing a path quality of communication paths in the second direction in the communication network to a path quality of communication paths in the second direction in the other communication network.

19. The apparatus according to claim 17, wherein the process further comprises:
when it is determined that it is possible for the node to migrate to the other communication network, sending a message to the node that instructs the node to migrate to the other communication network.

20. The apparatus according to claim 13, wherein the determining of the communication requirement comprises:
retrieving a service level agreement (SLA) associated with the nodes in the communication network; and
determining the communication requirement based on the SLA.

21. The apparatus according to claim 13, wherein the process further comprises:
sending a message to a central management node that indicates whether the communication path in the second direction satisfies the communication requirement.

22. The apparatus according to claim 13, wherein the monitoring of the path quality of communication paths in the second direction comprises:

monitoring one or more of: a transmission quality metric, error messages received due to packet delivery failure, a rate of transmission error/success, data transmission/receipt delay, and a level of asymmetry between a path quality of a communication path in the second direction and a path quality of the communication path in the first direction.

23. The apparatus according to claim 13, wherein the process further comprises:

determining an acceptable level of asymmetry between a path quality of a communication path in the second direction and a path quality of the communication path in the first direction.

24. The apparatus according to claim 13, wherein the process further comprises:

sending a message indicating a path quality metric in the second direction.

25. A tangible non-transitory computer readable medium storing program instructions that cause a computer to execute a process, the process comprising:

determining, based on reversing communication paths established in a first direction in a communication network, a plurality of communication paths in a second direction in the communication network;

monitoring a path quality of the communication paths in the second direction to determine a presence of asymmetric paths;

determining, based on the monitored path quality, whether the communication paths in the second direction satisfy a communication requirement and whether the communication paths are asymmetric;

detecting an asymmetric communication path of unacceptable quality in the second direction when the particular communication path in the second direction fails to satisfy the communication requirement;

in response to detecting the asymmetric communication path of unacceptable quality in the second direction, determining whether an alternative next-hop selection of a remote node exists that would remove the asymmetric communication path of unacceptable quality; and in response to determining that an alternate next-hop exists, modifying the next-hop selection of a remote node.

\* \* \* \* \*